United States Patent [19]

Mears

[11] 3,816,299

[45] June 11, 1974

[54] HYDROGENATION PROCESS
[75] Inventor: David E. Mears, Fullerton, Calif.
[73] Assignee: Union Oil Company of California, Los Angeles, Calif.
[22] Filed: Apr. 30, 1973
[21] Appl. No.: 355,576

[52] U.S. Cl. ............................ 208/143, 260/667
[51] Int. Cl. ............................ C10g 23/04
[58] Field of Search ................. 260/667; 208/143

[56] References Cited
UNITED STATES PATENTS

| | | | |
|---|---|---|---|
| 2,898,387 | 8/1959 | Teter | 260/667 |
| 3,422,001 | 1/1969 | Konwenhoven et al. | 208/143 |
| 3,449,452 | 6/1969 | Gatsis et al. | 260/667 |
| 3,457,162 | 7/1969 | Riedl et al. | 208/143 |
| 3,555,107 | 1/1971 | Estes et al. | 208/143 |
| 3,567,796 | 3/1971 | Estes et al. | 208/143 |
| 3,625,860 | 12/1971 | Condrasky | 252/415 |
| 3,637,878 | 1/1972 | Hansford | 260/667 |
| 3,639,227 | 2/1972 | Jacobson et al. | 208/143 |
| 3,703,461 | 11/1972 | Hansford | 208/143 |

*Primary Examiner*—Delbert E. Gantz
*Assistant Examiner*—Veronica O'Keefe
*Attorney, Agent, or Firm*—Lannas S. Henderson; Richard C. Hartman; Dean Sandford

[57] ABSTRACT

Aromatic hydrocarbons, particularly monocyclic hydrocarbons, are hydrogenated without substantial hydrocracking in the presence of a Group VIII metal hydrogenating component supported on a porous support such as alumina, while adding continuously or intermittently to the reaction zone a small proportion of carbon tetrachloride as a catalyst activator.

9 Claims, No Drawings

HYDROGENATION PROCESS

BACKGROUND AND SUMMARY OF THE INVENTION

Many hydrocarbon fractions designed for uses such as jet fuels, diesel fuels, gas turbine fuels, kerosenes, furnace oils, lubricating oils, and the like can be upgraded by hydrogenation of certain of the constituents, particularly aromatic constituents. For example furnace oil distillates from cracking processes usually contain a relatively large percentage of aromatic compounds as well as olefinic compounds. Because aromatic compounds in general have poor burning characteristics, conversion of the aromatics in such cracked distillates to the corresponding naphthenes is desirable to improve their quality. In the case of jet fuels, it is desirable to convert aromatic compounds to the corresponding naphthenes because of the higher heat of combustion of the more highly saturated compounds. In gasolines, it is sometimes desirable to remove aromatics before utilizing catalytic isomerization processes to improve octane ratings.

It is known to use certain hydrogenation catalysts, especially Group VIII noble metal catalysts, for effecting the hydrogenation of aromatic hydrocarbons. However, in view of the high cost of the noble metals, it is highly desirable to use as little of such metals as possible. Thus, the efficient utilization of the noble metal is a primary objective in the catalyst manufacturing arts. Great strides in this direction have been taken in recent years by preparing very highly dispersed noble metal sites on porous supports of high surface area. Even in the most efficient of these known catalysts, however, the noble metal constituent represents the major fraction of the cost of the catalyst.

A further improvement in efficiency of such catalysts is described in U.S. Pat. No. 3,639,227 as being obtainable by introducing a chloride compound into the hydrogenation zone. The only specific chloride disclosed is propylene dichloride. I have now discovered that chloride compounds differ widely in their promoting effect upon such catalysts. Specifically, hydrogen chloride itself has been found to be completely ineffective, if not detrimental, while the chlorohydrocarbons, e.g., 1-chloropropane and methylenedichloride, are only moderately effective. But, for reasons which are not at present understood, carbon tetrachloride has been found to be much more effective than the chlorohydrocarbons. Accordingly, it will be seen that the major achievement of the invention resides in increasing the efficiency of halide promotion of hydrogenation catalysts.

DETAILED DESCRIPTION OF THE INVENTION

This invention contemplates a process for hydrogenating aromatic hydrocarbons by reacting them with hydrogen under hydrogenation conditions in a reaction zone which contains a catalyst comprising a porous support having dispersed therein a Group VIII metal, while supplying a minor proportion of carbon tetrachloride continuously or intermittently to the reaction zone. Specifically contemplated metals are cobalt, nickel and iron and the Group VIII noble metals. However, it is especially preferred to use the noble metals, particularly platinum or palladium.

The process of this invention is particularly advantageous for the hydrogenation of feedstocks containing monocyclic aromatic hydrocarbons such as benzene, toluene, xylenes and the like. As is well known, the monocyclic aromatics are much more difficult to hydrogenate by conventional methods than are the fused-ring hydrocarbons such as naphthalene and the like. However the process may be applied to any hydrocarbon feedstock containing polycyclic and/or monocyclic aromatic hydrocarbons.

Any of the conventional, highly porous supports for dispersed metal-type catalysts can be used in accordance with the present invention, provided that they are capable of combining with halides to yield a Lewis acid structure. These include for example, magnesia, thoria, boria, zirconia, titania and mixtures thereof. Especially preferred are those porous supports of alumina, or combinations or mixtures of silica and alumina, having surface areas ranging generally between about 50 and 800 m$^2$/g and pore volumes ranging generally from about 0.1 to 2.0 ml/g. Crystalline aluminosilicate molecular sieve bases may also be used. The particular type of support or technique for its preparation is not believed to be critical and any of the conventional methods for producing high porosity supports can be used. For example, conventional silica-alumina cogels commonly used as cracking catalysts can be used as supports herein.

A particularly preferred form of catalyst involves the use of about 0.1 to 2.0 weight-percent of noble metal dispersed upon a porous alumina support. Another preferred form is described in copending application Ser. No. 47,559, filed June 18, 1970, now U.S. Pat. No. 3,637,484 by Rowland C. Hansford, entitled "Hydrogenation Process and Catalyst." Therein is described a particularly desirable hydrogenation catalyst comprising a porous support of silica-alumina gel having a silica-alumina weight ratio between about 20/80 and 40/60, a surface area between about 200 and 700 m$^2$/g, and a pore volume of about 0.8 to 2.0 ml/g, with about 15 to 60 percent of said pore volume being in pores of diameters greater than 500 A, the silica in said support being intimately composited with only a portion of the alumina component thereof. Such composites are essentially heterogeneous dispersions of silica-alumina cogel in an alumina matrix. The catalytic metal in these novel catalysts comprises platinum deposited on the support by ion exchange from an aqueous solution of platinum amminohydroxide.

The proportion of carbon tetrachloride employed should be sufficient to provide between about 0.01 and 1 volume-percent, preferably between about 0.05 and 0.5 volume-percent, of hydrogen halide equivalent in the total gas input to the reaction (recycle gas plus makeup hydrogen). The halide in the reactor apparently decomposes and adds halogen to the catalyst base in a form which remains fixed on the catalyst for a considerable period of time. Accordingly, it is entirely feasible to add the carbon tetrachloride intermittently instead of continuously. Where the carbon tetrachloride is added intermittently, it is normal preferable to utilize relatively high concentrations in the recycle gas; conversely when it is added continuously, proportions in the lower operative ranges may be preferred.

It is known in the art that the addition of halides to conventional catalyst supports such as alumina or silica-alumina increases the activity thereof for cracking reactions and isomerization reactions, as well as hydrocracking reactions. However the improved activity observed in these reactions is believed to stem from increased Bronsted acidity of the catalyst, which promotes the carbonium ion scission of carbon-to-carbon bonds. This mechanism however is not involved in the simple hydrogenation of aromatic hydrocarbons, and it hence came as a considerable surprise to find that hydrogenation activity can also be improved by the use of halides. In the practice of my process, temperatures are adjusted so as to substantially eliminate hydrocracking reactions; normally, less than about 1 volume-percent of the feed is isomerized or converted to lower molecular weight hydrocarbons.

Any of the conventional hydrogenation conditions can be employed, depending upon the particular hydrocarbons desired to be hydrogenated and the particular hydrogenation catalyst used. In general, the reaction temperatures range between about 200° and 1,000° F, preferably from about 300° to 600° F while the pressures range from about 1 to 300 atmospheres and preferably from about 15 to 50 atmospheres. The hydrogen to oil ratio ranges generally from about 1,000 to 30,000 standard cubic feet per barrel (scf/b) and preferably from about 2,000 to 6,000 scf/b. The liquid hourly space velocity ranges from about 1 to 20, preferably about 2 to 12.

It will be understood that, in order to avoid hydrocracking reactions, temperatures in the high ranges disclosed above will normally be utilized only in conjunction with relatively inactive, or deactivated catalysts. In other respects, the hydrogenation conditions, particularly temperature, hydrogen pressure and space velocity, are correlated so as to achieve the desired degree of hydrogenation, normally at least about 10–50 percent. A surprising aspect of the invention is that as much as 90–100 percent saturation of aromatics can be achieved while converting less than about 5 percent of the feed to isomeric or lower molecular weight products.

The invention will be better understood by reference to the following examples which illustrate typical uses of the process for hydrogenating a mixed hydrocarbon feed containing substantial quantities of aromatics. In these examples the hydrogenation rate constant, $K$, is calculated from the first order rate equation, $K = \text{LHSV} \ln (A_f/A_p)$, where $A_f$ and $A_p$ represent the percent aromatics in the feed and in the product, respectively.

EXAMPLE I

A mixed feed containing principally hexanes obtained by taking a 120° to 185° F boiling range cut from a petroleum hydrocracking unit was saturated employing the process of this invention. The feed had a gravity of 72.1° API and a benzene concentration 5 weight-percent (50,000 ppm). The feed was processed by passing it through a bed of hydrogenation catalyst prepared in accordance with the technique described in the above noted application Ser. No. 47,559. The catalyst comprised 0.5 percent platinum dispersed within a porous support by depositing the platinum by ion exchange from an aqueous solution of platinum amminohydroxide. The porous support comprised a silica-alumina gel having a silica to alumina weight-ratio of about 20/80 and a surface area to about 350 m²/g. The pore volume of the support was in the range of about 1.2 ml/g with about 36 percent of the pore volume being in pores of diameters greater than 500 A. The silica in the support was intimately composited with only a fraction of the alumina therein. Thus, the support comprised a heterogeneous composite of a silica-alumina cogel which was dispersed in a large-pore alumina gel matrix. The platinum was then dispersed principally upon the silica-alumina cogel.

Th hydrocarbon feed was processed by passing it through the bed of catalyst under the following conditions:

Temperature, °F 360
Pressure, psig 280
Liquid Hourly Space Velocity (LHSV) 4
H$_2$/Feed Ratio, scf/b 2,600

Analysis of the product from this operation showed that there remained about 8,000 parts per million of unconverted benzene, the resulting rate constant, K, being 7.3.

Carbon tetrachloride was then added to the feed hydrocarbon in a conventional of 0.3 cc/100 g feed (equivalent to about 0.4 volume-percent of HCl in the hydrogen input to the reactor) and the feed was continued to be passed through the catalyst under the same conditions described above. After about 70 hours, analysis of the product showed that the benzene concentration had dropped to about 150 ppm. This indicated that, based on first order kinetics, the hydrogenation activity of the catalyst had increased about 400 percent ($K = 32.4$).

The precise nature of the effect of the halide upon the catalytic activity is not known; however, the evidence indicates that some form of reaction or deposition of the halide upon the catalyst occurs. For example, analysis of the above catalyst showed a Cl content of 2.32 weight-percent; however, after hydrogen stripping for 300 hours (without additional added halide) the Cl content dropped to 0.94 weight-percent. Moreover, it was observed that the increased catalytic activity did not commence immediately upon the addition of halide in the hydrocarbon feed. Rather, there was a substantial time period of about one day before the catalyst efficiency reached a high level. This indicated that some time was required for the halide concentration to build up within the catalyst.

EXAMPLE II

This example was carried out in precisely the same manner as Example I, except that a different catalyst was used. The catalyst contained about 0.4 weight-percent platinum deposited upon a porous support of eta alumina having a surface area of about 400 m²/g and a pore volume of about 0.56 cc/g. After equilibrium conditions were achieved, analysis of the hydrocarbon product prior to the addition of carbon tetrachloride to the feed showed that the benzene concentration was 15,000 ppm, giving a rate constant of 4.8. However, after carbon tetrachloride was added to the feed for a period of 70 hours, the benzene concentration in the product dropped to approximately 1 ppm. This remarkable result indicated that the catalyst activity had undergone about a ninefold increase ($K = 43.2$) with the addition of the halide additive.

EXAMPLES III - VI

To evaluate the effect of various halide promoters, a series of four runs were carried out as described in Example I, except that the space velocity was 8 instead of 4, the hexane feed contained 37,200 ppm of benzene instead of 50,000, and the catalyst was a 1/16 inch extrudate of spray dried alumina impregnated with 0.57 weight-percent Pt. The halide promoters tested were carbon tetrachloride, hydrogen chloride, 1-chloropropane and methylenedichloride. The results were as follows: Table 1

| Example | Hours on Stream | Promoter | Average Benzene Content of Product, ppm | Rate Constant K |
|---|---|---|---|---|
| III | 5–98 | $CCl_4$ | 720 | 31.6 |
| IV | 110–122 | HCl | 35,000 | 0.46 |
| V | 134–170 | $C_3H_7Cl$ | 5,500 | 15.3 |
| VI | 182–222 | $CH_2Cl_2$ | 16,100 | 6.7 |

The marked superiority of carbon tetrachloride is readily apparent, as is the total ineffectiveness of hydrogen chloride.

The foregoing shows the very apparent and remarkable advantages that can be achieved to increase catalyst activities in hydrogenation processes. Thus, benefits can be achieved either by reducing the amount of catalyst required for a given operation, or by increasing the throughput of hydrocarbon feed without reducing the degree of saturation of the product. These and other advantages will be readily apparent to those skilled in the art.

The following claims, and their obvious equivalents, are intended to define the true scope of the invention.

I claim:

1. A process for hydrogenating a feedstock containing at least one aromatic hydrocarbon which comprises passing said feedstock in admixture with hydrogen and at an elevated temperature and pressure through a catalytic hydrogenation zone containing a Group VIII metal hydrogenating component supported on a porous refractory base capable of combining with hydrogen chloride, and adding intermittently or continuously to the hydrogenation zone a minor proportion of carbon tetrachloride.

2. A process as defined in claim 1 wherein said Group VIII metal is platinum or palladium, and wherein said porous support comprises a substantial proportion of alumina.

3. A process as defined in claim 1 wherein said porous support comprises principally a member selected from the group consisting of silica, alumina, magnesia, thoria, boria, zirconia, titania, and mixtures thereof.

4. A process as defined in claim 1 wherein said feedstock comprises a substantial proportion of monocyclic aromatic hydrocarbons which are hydrogenated during the process.

5. A process as defined in claim 4 wherein the hydrogenation conditions are correlated so as to saturate at least about 50 percent of said monocyclic aromatic hydrocarbons.

6. A process for hydrogenating a monocyclic aromatic hydrocarbon-containing feedstock which comprises contacting said feedstock in a hydrogenation zone with a catalyst comprising a Group VIII noble metal hydrogenation component dispersed and supported on a porous support comprising a substantial proportion of alumina, while adding intermittently or continuously to the hydrogenation zone a minor proportion of carbon tetrachloride, said hydrogenation being carried out at a temperature adjusted to effect a substantial hydrogenation of the monocyclic aromatic hydrocarbon content of said feedstock while converting less than about 1 volume-percent of said feedstock to lower molecular weight hydrocarbons.

7. A process as defined in claim 6 wherein said Group VIII noble metal is palladium or platinum.

8. A process as defined in claim 6 wherein said carbon tetrachloride is employed in proportions of hydrogen halide equivalent ranging between about 0.01 percent and 1 percent by volume of the total gas feed to the hydrogenation zone.

9. A process as defined in claim 6 wherein said porous support comprises a silica-alumina gel having a silica/alumina weight-ratio between about 20/80 and 40/60, a surface area between about 200 and 700 $m^2/g$, and a pore volume of about 0.8 to 2.0 ml/g, with about 15 to 60 percent of said pore volume being in pores of diameter greater than about 500 A, the silica in said support being intimately composited with only a portion of the alumina component thereof; and said catalytic metal comprises platinum originally deposited on the support by ion exchange from an aqueous solution containing a platinum amminohydroxide.

* * * * *